United States Patent
Wang et al.

(10) Patent No.: US 7,870,313 B2
(45) Date of Patent: Jan. 11, 2011

(54) METHOD AND STRUCTURE TO SUPPORT SYSTEM RESOURCE ACCESS OF A SERIAL DEVICE IMPLEMENTATING A LITE-WEIGHT PROTOCOL

(75) Inventors: Chi-Lie Wang, Milpitas, CA (US); Jason Z. Mo, Femont, CA (US); Calvin Nguyen, San Jose, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 956 days.

(21) Appl. No.: 11/679,817

(22) Filed: Feb. 27, 2007

(65) Prior Publication Data

US 2008/0205422 A1    Aug. 28, 2008

(51) Int. Cl.
*G06F 3/00* (2006.01)
*G06F 13/00* (2006.01)

(52) U.S. Cl. .................. 710/52; 710/22; 710/105; 710/310; 370/412

(58) Field of Classification Search ............ 710/52–56, 710/22–28, 105–106, 305–310; 370/412–419, 370/389
See application file for complete search history.

(56) References Cited

U.S. PATENT DOCUMENTS

| | | | |
|---|---|---|---|
| 4,090,238 A | 5/1978 | Russo | |
| 4,438,489 A | 3/1984 | Heinrich et al. | |
| 4,768,149 A | 8/1988 | Konopik et al. | |
| 5,202,964 A | 4/1993 | Crouch | |
| 5,530,902 A | 6/1996 | McRoberts et al. | |
| 5,578,953 A | 11/1996 | Nuckols | |
| 5,608,873 A | 3/1997 | Feemster et al. | |
| 5,682,480 A * | 10/1997 | Nakagawa | 712/28 |
| 5,737,547 A | 4/1998 | Zuravleff et al. | |
| 5,850,399 A | 12/1998 | Ganmukhi et al. | |
| 5,905,913 A | 5/1999 | Garrett et al. | |
| 5,991,304 A | 11/1999 | Abramson | |
| 5,991,817 A | 11/1999 | Rowett et al. | |
| 6,070,219 A | 5/2000 | McAlpine et al. | |
| 6,145,007 A | 11/2000 | Dokic et al. | |
| 6,189,049 B1 | 2/2001 | Klein | |
| 6,222,846 B1 | 4/2001 | Bonola et al. | |
| 6,393,507 B2 | 5/2002 | Klein | |
| 6,401,142 B1 | 6/2002 | Williams et al. | |
| 6,546,482 B1 | 4/2003 | Magro et al. | |

(Continued)

FOREIGN PATENT DOCUMENTS

DE    101 55 486 A1    5/2003

*Primary Examiner*—Christopher B Shin
(74) *Attorney, Agent, or Firm*—Bever, Hoffman & Harms LLP

(57) ABSTRACT

On-chip resources of a serial buffer are accessed using priority packets of a Lite-weight protocol. A priority packet path is provided on the serial buffer to support priority packets. Normal data packets are processed on a normal data packet path, which operates in parallel with the priority packet path. The system resources of the serial buffer can be accessed in response to the priority packets, without blocking the flow of normal data packets. Thus, normal data packets may flow through the serial buffer with the maximum bandwidth supported by the serial interface. The Lite-weight protocol also supports read accesses to queues of the serial buffer (which reside on the normal data packet path). The Lite-weight protocol also supports doorbell commands for status/error reporting.

28 Claims, 3 Drawing Sheets

U.S. PATENT DOCUMENTS

| | | |
|---|---|---|
| 6,920,146 B1 | 7/2005 | Johnson et al. |
| 6,954,811 B2 | 10/2005 | Vishnu |
| 7,016,352 B1 | 3/2006 | Chow et al. |
| 7,154,902 B1 | 12/2006 | Sikdar |
| 7,209,137 B2 * | 4/2007 | Brokenshire et al. ........ 345/423 |
| 7,313,670 B2 | 12/2007 | Matsushita |
| 7,353,360 B1 | 4/2008 | Muller et al. |
| 7,369,078 B2 | 5/2008 | Nickel et al. |
| 7,395,362 B2 | 7/2008 | Drexler et al. |
| 7,433,363 B2 * | 10/2008 | Rosen et al. ................ 370/413 |
| 7,433,985 B2 | 10/2008 | Ayyar et al. |
| 7,548,586 B1 | 6/2009 | Mimar |
| 7,701,949 B1 | 4/2010 | Rose et al. |
| 2002/0161959 A1 | 10/2002 | Apostol et al. |
| 2002/0165897 A1 * | 11/2002 | Kagan et al. ................ 709/102 |
| 2003/0061431 A1 | 3/2003 | Mears et al. |
| 2003/0095536 A1 | 5/2003 | Hu et al. |
| 2004/0123175 A1 | 6/2004 | Roth et al. |
| 2004/0266267 A1 | 12/2004 | Inaba |
| 2005/0015529 A1 | 1/2005 | Jung et al. |
| 2005/0138246 A1 | 6/2005 | Chen et al. |
| 2005/0249115 A1 * | 11/2005 | Toda et al. .................. 370/229 |
| 2005/0273540 A1 | 12/2005 | Whaley |
| 2006/0039370 A1 * | 2/2006 | Rosen et al. ................ 370/389 |
| 2006/0168384 A1 | 7/2006 | Radhakrishnan et al. |
| 2006/0248376 A1 * | 11/2006 | Tezcan et al. .................. 714/4 |
| 2006/0248377 A1 * | 11/2006 | Tezcan et al. .................. 714/4 |
| 2007/0162642 A1 | 7/2007 | Tousek |
| 2007/0230495 A1 * | 10/2007 | Li .............................. 370/412 |
| 2008/0019371 A1 | 1/2008 | Anschutz et al. |
| 2008/0209089 A1 * | 8/2008 | Mo et al. ...................... 710/71 |
| 2010/0014440 A1 * | 1/2010 | Yazaki et al. ............... 370/252 |

* cited by examiner

METHOD AND STRUCTURE TO SUPPORT SYSTEM RESOURCE ACCESS OF A SERIAL DEVICE IMPLEMENTATING A LITE-WEIGHT PROTOCOL

RELATED APPLICATIONS

U.S. patent application Ser. No. 11/679,813 "PACKET-BASED PARALLEL INTERFACE PROTOCOL FOR A SERIAL BUFFER HAVING A PARALLEL PROCESSOR PORT", by Jason Z. Mo and Stanley Hronik.

U.S. patent application Ser. No. 11/679,820 "HARDWARE-BASED CONCURRENT DIRECT MEMORY ACCESS (DMA) ENGINES ON SERIAL RAPID INPUT/OUTPUT SRIO INTERFACE", by Chi-Lie Wang and Bertan Tezcan.

U.S. patent application Ser. No. 11/679,823 "RAPID INPUT/OUTPUT DOORBELL COALESCING TO MINIMIZE CPU UTILIZATION AND REDUCE SYSTEM INTERRUPT LATENCY", by Chi-Lie Wang, Kwong Hou ("Ricky") Mak and Jason Z. Mo.

U.S. patent application Ser. No. 11/679,824 "MULTI-BUS STRUCTURE FOR OPTIMIZING SYSTEM PERFORMANCE OF A SERIAL BUFFER", by Steve Juan, Chi-Lie Wang and Ming-Shiung Chen.

BACKGROUND OF THE INVENTION

1. Field of the Invention

The present invention relates to serial buffers. More specifically, the present invention relates to an improved method for accessing on-chip resources of a serial buffer configured to implement a Lite-weight protocol.

2. Related Art

Serial buffers are typically used to implement an offload device, a data buffer or a pass-through FIFO. Some conventional serial buffers are configured to implement an advanced interface protocol, such as sRIO (serial rapid input/output), while other conventional serial buffers have been configured to implement less advanced protocols, such as SerialLite (as specified by FPGA maker Altera) and Aurora (as specified by FPGA maker Xilinx). These less advanced protocols are hereinafter referred to as Lite-weight protocols.

A Lite-weight protocol is characterized by a simplified protocol stack, which enables efficient data transfer with a low pin count, a low power requirement, a long cable length, and high performance. Lite-weight protocols use a packet format and a serial data stream. However, serial buffers configured to implement Lite-weight protocols require dedicated pins and circuitry to provide access to the on-chip resources of the serial buffer (e.g., registers, queues and/or buffer memory). This dedicated circuitry undesirably complicates the design and operation of the serial buffer.

It would therefore be desirable to have an improved method for accessing the on-chip resources of a serial buffer implementing a Lite-weight protocol. It would also be desirable for this improved method to be capable of implementing status and error reporting.

SUMMARY

Accordingly, the present invention provides a method and structure for accessing on-chip resources of a serial buffer using the packets of a Lite-weight protocol implemented by the serial buffer. In accordance with one embodiment, a priority packet path is provided on the serial buffer to support priority packets. Normal data packets are processed on a normal packet path, which operates in parallel with the priority packet path. The system resources of the serial buffer can be accessed in response to the priority packets, without blocking the flow of normal data packets. Thus, normal data packets may flow through the serial buffer with the maximum bandwidth supported by the serial interface running the Lite-weight protocol.

In one embodiment, start of packet (SOP) and end of packet (EOP) indicators are used to identify incoming and outgoing priority packets. Each priority packet also has a 4-bit packet identifier, which can be used to ensure packet integrity. If the received packet identifier is not sequential or is out of order, the serial buffer may request retransmission of any lost packets. To access registers of the serial buffer, the priority packets may include a register address and a read or write instruction. Priority packets may also be used to transmit data retrieved from an accessed register.

In accordance with another embodiment of the present invention, the priority packets can be used to implement a doorbell command, which is used to report status and errors. The doorbell command may include a flag register identifier and associated flags, thereby identifying registers within the serial buffer that require attention.

In accordance with another embodiment of the present invention, the priority packets can be used to implement a read command, which is used to read packets or double words from a queue of the serial buffer, while the serial buffer is in a slave mode. The read command identifies a queue to be accessed within the serial buffer, along with a packet/double word count value. Upon receiving a read command, the selected queue will be accessed. If the queue is configured in packet mode, the number of packets specified by the packet/double word value will be returned. If the queue is in configured in raw data mode, the number of double words identified by the packet/double word count value will be returned.

The present invention will be more fully understood in view of the following description and drawings.

DETAILED DESCRIPTION

Figure 1:
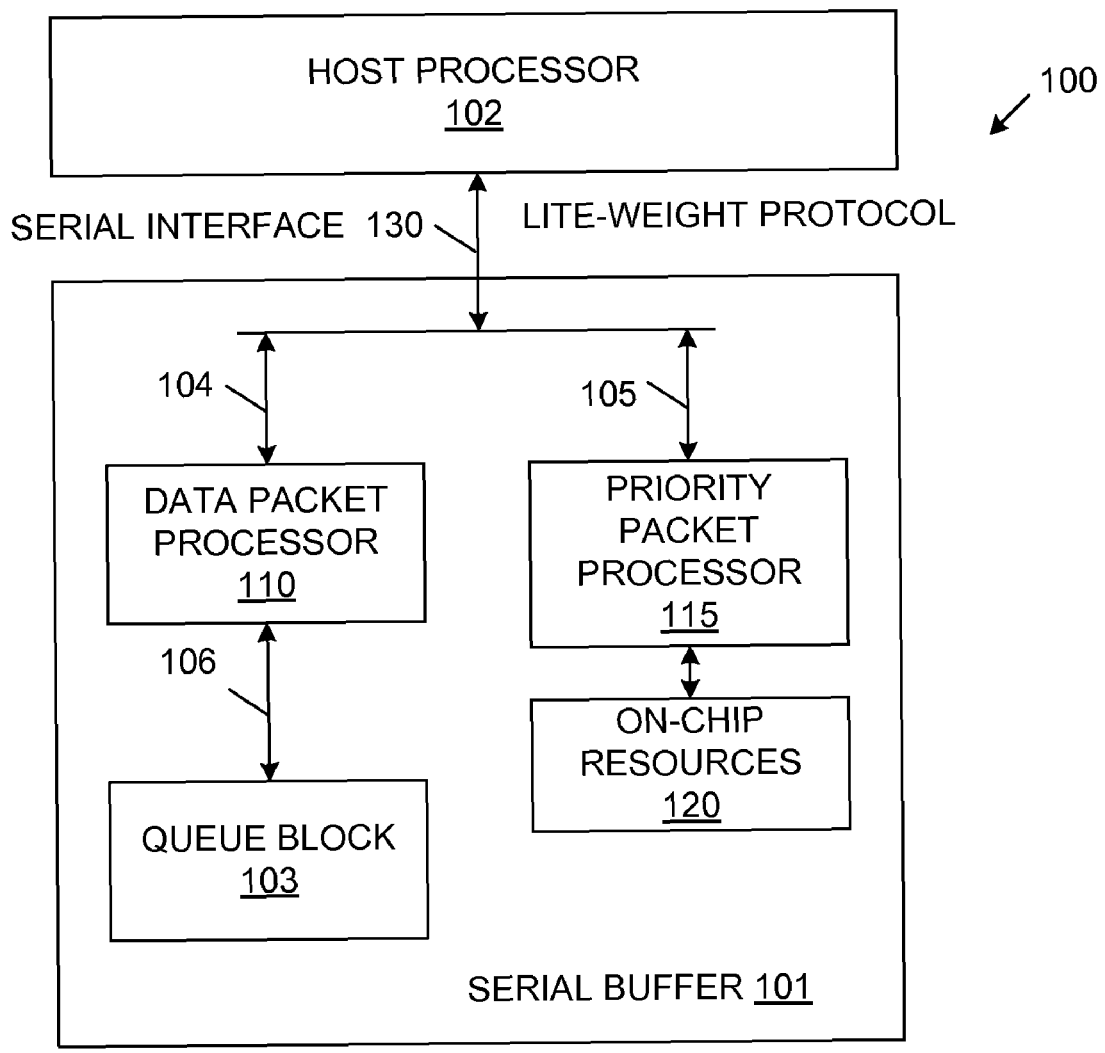
FIG. 1 is a block diagram of a system which includes a serial buffer in accordance with one embodiment of the present invention.

FIG. 1 is a block diagram of a system 100, which includes a serial buffer 101 in accordance with one embodiment of the present invention. Serial buffer 101 is coupled to a host processor 102 via a serial interface 130 that implements a Lite-weight protocol. In accordance with one embodiment of the present invention, data packets are routed between serial buffer 101 and the serial interface 130 on a dedicated data packet bus 104. Priority packets (which are described in more detail below), are routed between serial buffer 101 and serial interface 130 on a dedicated priority packet bus 105. A single set of bus lines carries both data packets and priority packets from host processor 102 to serial buffer 101. These packets are separated on serial buffer 101. In accordance with one embodiment, these packets can be separated as described in commonly owned, co-filed U.S. patent application Ser. No. 11/679,824, which is hereby incorporated by reference in its entirety.

Data packets received on data packet bus 104 are processed within data packet processor 110, and are written to queues within queue block 103 on bus 106. Similarly, data may be transferred from queue block 103 to data packet processor 110 on bus 106, and then to host processor 102 via data packet bus 104. Note that queue block 103 may be constructed using internal memory of serial buffer 101, or by using external memory, or by using a combination of internal and external memory.

Priority packets received on priority packet bus 105 are provided to priority packet processor 115. In response, priority packet processor 115 accesses on-chip resources 120 of serial buffer 101. The on-chip resources 120 can include, for example, internal registers, queues and/or error/status flags of serial buffer 101. In this manner, the priority packets can be processed in parallel with the data packets. As a result, the priority packets can be processed immediately, without having to wait for the processing of a data packet to be completed. Moreover, the priority packets are prevented from blocking the normal data packet traffic flow.

In accordance with one embodiment of the present invention, the serial buffer 101 receives the normal data packets and priority packets in the form of 72-bit double words. In this embodiment, each of the 72-bit double words includes an 8-bit control field and a 64-bit payload field. The 8-bit control field includes a start of packet/end of packet (SOP/EOP) indicator and other control signals that are not relevant to the present invention. Other priority packet formats can be used in other embodiments of the present invention. Note that the priority packet format of the present invention is consistent with the priority packet format of a Lite-weight protocol.

Priority packet processor 115 monitors the SOP/EOP identifier of each incoming 72-bit double word received on priority packet bus 105 to determine whether the SOP/EOP identifier of the double word identifies a priority packet header. If the SOP/EOP identifier identifies the start of a priority packet, then an associated 64-bit payload is formatted and processed in the manner described below.

Figure 2:
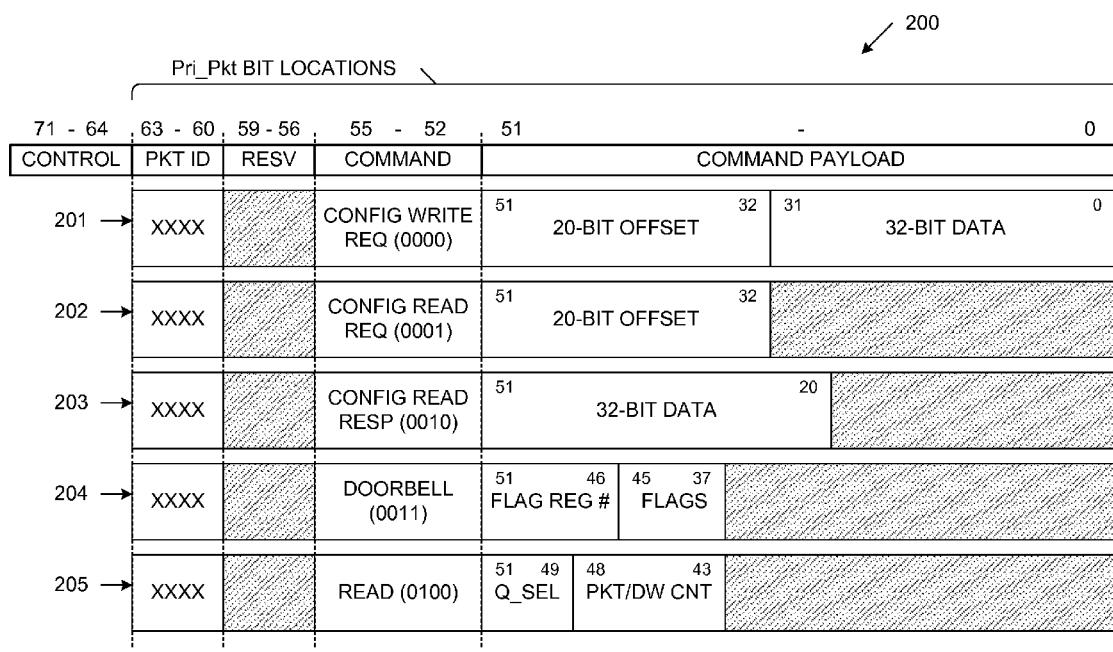
FIG. 2 is a table illustrating the formatting of the payload portions of various priority packets used by a Lite-weight protocol in accordance with one embodiment of the present invention.

FIG. 2 is a table 200 illustrating the formatting of various 64-bit payloads 201-205 that are included in priority packets in accordance with one embodiment of the present invention. Each of the priority packet payloads 201-205 includes a packet identifier field (at bit locations 63-60), a reserved field (at bit locations 59-56), a command field (at bit locations 55-52), and a command payload field (at bit locations 51-0). Note that the SOP/EOP identifiers associated with priority packet payloads 201-205 are not illustrated in FIG. 2 for purposes of clarity.

The 4-bit packet identifier field is used to ensure the integrity of the incoming priority packets. In accordance with one embodiment, the incoming priority packets are sequentially numbered. Thus, upon detecting that the incoming priority packets are not sequential or out of order, the serial buffer may request the sender to retransmit the lost packets.

The 4-bit command field is used to identify a configuration write request (0000), a configuration read request (0001), a configuration read response (0010), a doorbell command (0011), or a read command (0100). Although only five commands are described in the present specification, it is understood that other commands can be implemented in other embodiments of the present invention.

The 52-bit command payload field is used to transmit address, data and control information associated with the corresponding command. The command payload fields associated with the various commands will now be described in more detail.

The configuration write request (represented by priority packet payload 201) includes a 20-bit offset address (at bit locations 51-32) which identifies a register of the serial buffer to be written, followed by a 32-bit data value (at bit locations 31-0) to be written into the addressed register of the serial buffer.

The configuration read request (represented by priority packet payload 202) includes a 20-bit offset address (at bit locations 51-32), which identifies a register of the serial buffer to be read.

The configuration read response (represented by priority packet payload 203) includes a 32-bit data value (at bit locations 51-20), which represents the data returned from a register accessed in response to a configuration read request.

The doorbell command (represented by priority packet payload 204) includes a 6-bit flag register number (at bit locations 51-46), which identifies a flag register that requires attention, and an 8-bit flag signal (at bit locations 45-37) which specifies the values of the various flags stored in the flag register identified by the flag register number.

The read command (represented by priority packet payload 205) includes a 3-bit queue select signal (at bit locations 51-49) and a 6-bit packet/double word count value (at bit locations 48-43). The 3-bit queue select signal is used to select one of up to eight queues in the serial buffer for a read access. The 6-bit packet/double word count value is used to specify the number of packets or double words to be read from the selected queue.

Figure 3:
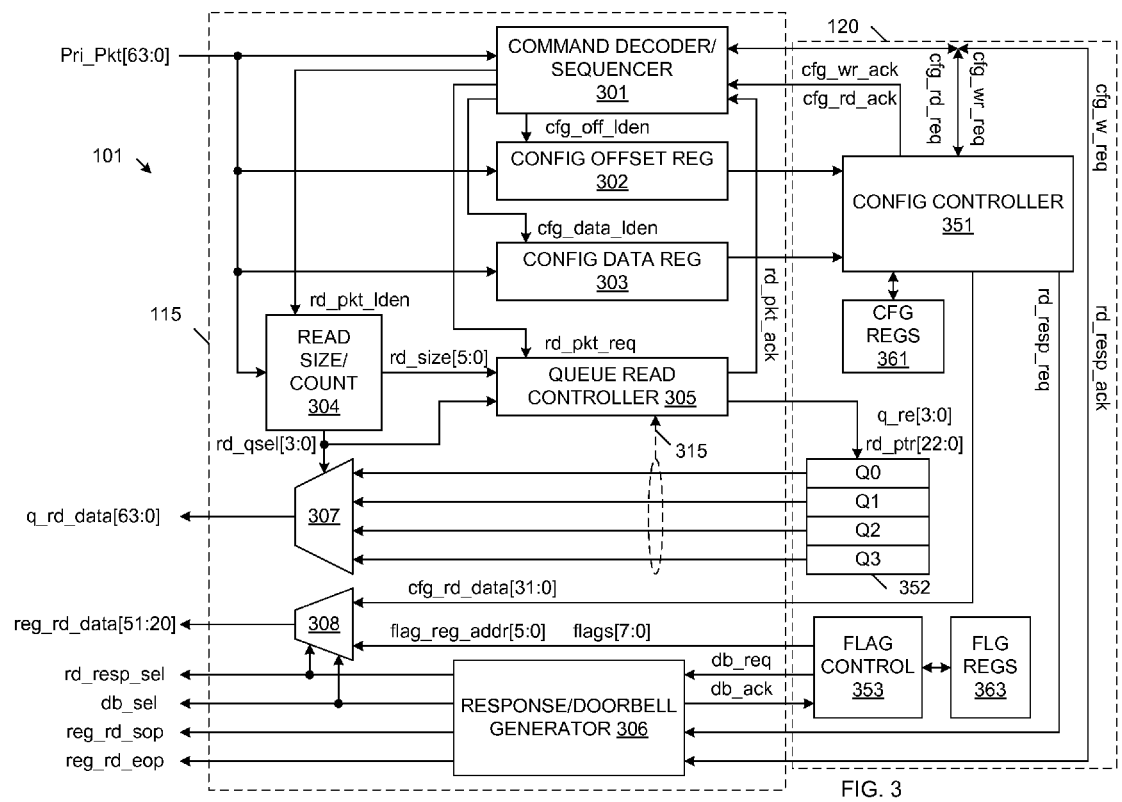
FIG. 3 is a block diagram of a priority packet processor, which is used to provide access to configuration registers, queues and flag registers of a serial buffer in response to the priority packets of FIG. 2.

FIG. 3 is a block diagram of priority packet processor 115 and on-chip resources 120 of serial buffer 101, in accordance with one embodiment of the present invention. Priority packet processor 115 includes command decoder/sequencer 301, configuration offset register 302, configuration data register 303, read size/count register 304, queue read control circuit 305, response/doorbell generator 306 and multiplexers 307-308. On-chip resources 120 include configuration controller 351, configuration registers 361, queues 352, flag controller 353 and flag registers 363. Priority packet processor 115 provides access to the on-chip resources 120 using the priority packets defined by FIG. 2.

As described above, the incoming 72-bit double words of priority packets are received on a dedicated priority packet bus 105 within serial buffer 101. This bus is configured to route the 64-bit priority packet payloads (Pri_Pkt[63:0]) to command decoder/sequencer 301, configuration offset circuit 302, configuration data circuit 303, and read size/count register 304.

Command decoder/sequencer 301 is used to decode the command field of the received priority packet payload (i.e., Pri_Pkt[55:52]). If command decoder/sequencer 301 determines that the received priority packet specifies a configuration write request (i.e., Pri_Pkt[55:52]='0000'), then command decoder/sequencer 301 activates a configuration write request signal (cfg_wr_req), a configuration offset register load enable signal (cfg_off_lden), and a configuration data register load enable signal (cfg_data_lden), which are applied to configuration controller 351, configuration offset register 302 and configuration data register 303, respectively. The activated cfg_off_lden signal causes the 20-bit offset address of the received priority packet (i.e., Pri_Pkt[51:32]) to be loaded into configuration offset register 302. Similarly, the activated cfg_data_lden signal causes the 32-bit data value of the received priority packet (i.e., Pri_Pkt[31:0]) to be loaded into configuration data register 303. When configuration controller 351 is available to perform the requested write operation, configuration controller 351 activates a write acknowledge signal (cfg_wr_ack), which is returned to command decoder/sequencer 301 to grant the write access. At this time, command decoder/sequencer 301 causes configuration controller 351 to write the data stored in configuration data register 303 to be written to a configuration register in configuration register block 361 specified by the offset address stored in configuration offset register 302.

If command decoder/sequencer 301 determines that the received priority packet specifies a configuration read request (i.e., Pri_Pkt[55:52]='0001'), then command decoder/sequencer 301 will activate a configuration read request signal (cfg_rd_req). Command decoder/sequencer 301 also activates the configuration offset load enable signal (cfg_offset_lden), which causes the offset address of the received priority packet (i.e., Pri_Pkt[51:32]) to be loaded into configuration offset register 302. Upon becoming available to process the configuration read request command, configuration controller 351 activates a read acknowledge signal (cfg_rd_ack), which is returned to command decoder/sequencer 301, thereby indicating that the processing of the configuration read request has begun. At this time, configuration controller 351 reads the requested data value out of the configuration register identified by the address stored in configuration offset register 302. This read data value is latched in configuration controller 351, and provided to multiplexer 308 as a configuration read data value, cfg_rd_data[31:0].

At this time, configuration controller 351 activates a read response request signal (rd_resp_req), which is provided to response/doorbell generator 306. As long as response/doorbell generator 306 is not responding to a doorbell request (as described in more detail below), response/doorbell generator 306 will activate a read response select signal (rd_resp_sel), which causes multiplexer 308 to route the configuration read data value cfg_rd_data[31:0] as a register read data value reg_rd_data[51:20]. The read response select signal rd_resp_sel and the register read data value reg_rd_data[51:20] are provided to an encoder circuit (not shown).

Response/doorbell generator 306 also activates a register read start-of-packet indicator (reg_rd_sop) to identify the start of the associated priority packet, and a register read end of packet indicator (reg_rd_eop) to identify the end of the associated priority packet. These indicators reg_rd_sop and reg_rd_eop are also provided to the encoder circuit.

Upon detecting that the reg_resp_sel signal has been activated, the encoder circuit generates a 72-bit double word (i.e., a priority packet) that transmits the register read data value reg_rd_data[51:20] to the entity that issued the corresponding configuration read request. The 72-bit double word generated by the encoder includes an 8-bit control field having an SOP/EOP indicator, and a 64-bit payload having the format defined by priority packet payload 103. Thus, this 64-bit payload includes a command field that identifies the payload as a response to a configuration read request (i.e., Pri_Pkt[55:52]='0010'). This 64-bit payload also includes the read data value retrieved from the addressed register (i.e., Pri_Pkt[51:20]=reg_rd_data[51:20]).

In the foregoing manner, the read data value is packaged in a priority packet that is returned to the requester. After the read data value has been transmitted through multiplexer 308, response/doorbell generator 306 activates a read response acknowledge signal (rd_resp_ack), which is returned to command decoder/sequencer 301. In response, command decoder/sequencer 301 de-asserts the configuration read request signal (cfg_rd_req) to complete the configuration read transaction.

If command decoder/sequencer 301 determines that the received priority packet specifies a packet read command (i.e., Pri_Pkt[55:52]='0100'), command decoder/sequencer 301 will activate a read packet request signal (rd_pkt_req), which activates queue read control circuit 305. In addition, command decoder/sequencer 301 also activates a read packet load enable signal (rd_pkt_lden), which causes the 3-bit queue select signal (Pri_Pkt[51:49]) and the 6-bit packet count/double word identifier (Pri_Pkt[48:43]) of the received priority packet to be latched into read size/count circuit 304. Read size/count circuit 304 decodes the latched 3-bit queue select signal to provide a 4-bit read queue select signal (rd_qsel[3:0]), which identifies a queue to be read. The read queue select signal rd_qsel[3:0] is applied to multiplexer 307 and read queue control circuit 305. Although the present example only includes four queues (Q0-Q3), it is understood that other numbers of queues can be used in other embodiments of the present invention.

The read queue select signal rd_qsel[3:0] causes multiplexer 307 to route data from one of the four queues Q0-Q3 present in queue circuit 352. For example, a read queue select signal rd_qsel[3:0] having a value of '0001' may cause multiplexer 307 to route data from queue Q0. The data read from queue circuit 352 and provided at the output of multiplexer 307 are labeled as queue read data values q_rd_data[63:0].

The read queue select signal rd_qsel[3:0] is also stored by the activated queue read controller 305. In response, queue read controller 305 provides a queue read enable signal q_re[3:0] to queue circuit 352. The queue read enable signal q_re[3:0] enables data to be read from a selected one of the queues Q0-Q3 of the queue circuit 352.

The activated queue read controller 305 also provides a read pointer rd_ptr[22:0] to queue circuit 352. The read pointer rd_ptr[22:0] specifies the address of the next entry to be read from the selected queue of queue circuit 352. In the described examples, the read pointer rd_ptr[22:0] is capable of specifying up to 223 entries.

The read size/count circuit 304 also provides the latched 6-bit packet count/double word identifier (Pri_Pkt[48:43]) to the activated queue read controller 305 as a read size signal, rd_size[5:0]. The activated queue read controller 305 stores the received read size signal rd_size[5:0] in a read counter (not shown).

Serial buffer 101 is capable of operating in a packet mode or a raw data mode. When serial buffer 101 is configured to operate in a packet mode, the read size signal identifies the number of packets to be read from the selected queue of queue circuit 352. When serial buffer 101 is configured to operate in a raw data mode, the read size signal identifies the number of double-words to be read from the selected queue of queue circuit 352.

After the read access to the selected queue has been granted, queue read controller 305 causes data to be read from the selected queue. Queue read controller 305 monitors the data read from the selected queue (as represented by dashed element 315 of FIG. 2). The read pointer rd_ptr[22:0] is incremented each time that a double-word is read from the selected queue. When serial buffer 101 is configured to operate in the raw data mode, queue read controller 305 decrements the read counter (which was originally loaded with the value of the read size signal rd_size[5:0]) each time the read pointer is incremented (i.e., each time a double word is read out of the selected queue). Similarly, when serial buffer 101 is configured to operate in the packet mode, queue read controller 305 decrements the read counter each time a packet is read out of the selected queue. In the described embodiments, queue read controller 305 identifies the packets read from the selected queue by monitoring the SOP/EOP indicators in the control field associated with the data read from the selected queue. For example, queue read controller may decrement the read counter each time that an SOP indicator is read from the selected queue.

The queue read data values q_rd_data[63:0] are routed to the requesting device on the normal packet bus 104. Queue read controller 305 adds the associated SOP/EOP indicators to the control fields of these priority packets.

When the read counter reaches zero, queue read control circuit 305 stops incrementing the read pointer rd_ptr[22:0] and asserts a read packet acknowledge signal (rd_pkt_ack) to indicate that the packet read transaction is complete. In response, command decoder/sequencer 301 de-asserts the read packet request signal (rd_pkt_req), thereby de-activating queue read controller 305. Note that queue read controller 305 stores the last valid read pointer value for each of the four queues Q0-Q3 to facilitate subsequent read accesses of these queues.

In accordance with another embodiment of the present invention, flag controller/registers 353 may implement a doorbell request. In general, the doorbell request is used to report status and/or error conditions of serial buffer 101. Flag controller 353 monitors the contents of flag registers 363 to determine when status/error conditions should be reported by a doorbell request. To initiate a doorbell request, flag controller 353 asserts a doorbell request signal db_req (which is provided to response/doorbell generator 306). Flag controller 353 also provides a flag register address flag_reg_addr[5:0] and a corresponding set of flags, flags[7:0] (retrieved from flag registers 363) to multiplexer 308. The flag register address identifies the register reporting the status/error condition(s), while the set of flags specify the particular status/error condition(s).

Upon receiving the asserted doorbell request signal db_req, response/doorbell generator 306 asserts a multiplexer control signal db_sel, which causes multiplexer 308 to route the flag register address flag_reg_addr[5:0] as the register read data signals reg_rd_data[51:46], and the corresponding set of flags flags[7:0] as the register read data signals reg_rd_data[45:37] The register read data signals reg_rd_data[51:37] are provided to an encoder circuit (not shown), along with the doorbell select signal db_sel.

Response/doorbell generator 306 also activates the register read start-of-packet indicator (reg_rd_sop) to identify the start of the doorbell priority packet, and the register read end of packet indicator (reg_rd_eop) to identify the end of the doorbell priority packet. These indicators reg_rd_sop and reg_rd eop are also provided to the encoder circuit.

Upon detecting that the doorbell select signal has been asserted, the encoder circuit generates a 72-bit double word (i.e., a priority packet). The 72-bit double word generated by the encoder includes an 8-bit control field having an SOP/EOP signal and a 64-bit payload having the format defined by priority packet payload 104. Thus, this 64-bit payload includes a command field that identifies the payload as a doorbell request (i.e., Pri_Pkt[55:52]='0011'). This 64-bit payload also includes flag register address and the corresponding set of flags provided by flag controller 353 (i.e., Pri_Pkt[51:46]=reg_rd_data[51:46], and Pri_Pkt[45:37]=reg_rd_data[45:37]). Serial buffer 101 transmits the resulting priority packet to the appropriate entity (e.g., host 102, which requires the status/error information associated with the set of flags). After receiving the status/error information, the receiving entity will handle this information accordingly.

After the doorbell priority packet has been transmitted, response/doorbell generator 306 activates a doorbell acknowledge signal db_ack, which is returned to flag controller 353. In response, flag controller 353 de-asserts the doorbell request signal db_req, thereby causing response/doorbell generator 306 to de-assert the doorbell select signal db_sel to complete the doorbell request.

In the foregoing manner, priority packet processor 115 enables registers 361, queues 352 and flags 363 of serial buffer 101 to be accessed in an expedited manner. That is, priority packet processor 115 may access the above-listed on-chip resources of the serial buffer 101, without having to wait for normal data packets to be processed by the serial buffer. This advantage exists because priority packet processor 115 allows the priority packets to be processed in parallel with normal data packets on the serial buffer 101.

Although the present invention has been described in connection with several embodiments, it is understood that this invention is not limited to the embodiments disclosed, but is capable of various modifications which would be apparent to one of ordinary skill in the art. Thus, the invention is limited only by the following claims.

We claim:

1. A serial buffer comprising:
   a serial interface that receives both data packets and priority packets;
   a data processor coupled to receive the data packets, but not the priority packets, from the serial interface, wherein the data processor transfers the data packets to one or more queues; and
   a priority packet processor coupled to receive the priority packets, but not the data packets, from the serial interface, wherein the priority packet processor accesses on-chip resources of the serial buffer in response to the priority packets.

2. The serial buffer of claim 1, wherein each of the priority packets includes a control field identifying the start of a priority packet.

3. The serial buffer of claim 1, wherein the priority packets received on the serial interface are sequentially numbered using a packet identification field, which is included in each of the priority packets.

4. The serial buffer of claim 1, wherein the priority packet processor includes a decoder configured to decode commands embedded in the priority packets, thereby identifying different types of access operations specified by the priority packets.

5. The serial buffer of claim 4, wherein the priority packet processor further includes an address register configured to store address information embedded in the priority packets, wherein the address information identifies on-chip resources of the serial buffer to be accessed.

6. The serial buffer of claim 5, wherein the priority packet processor further includes a data register configured to store data embedded in the priority packets, wherein the data is transferred from the data register to the on-chip resources identified by the address information stored in the address buffer.

7. The serial buffer of claim 4, wherein the priority packet processor is configured to implement a configuration read access to an on-chip register of the serial buffer in response to a configuration read command embedded in a priority packet.

8. The serial buffer of claim 7, wherein the priority packet processor further includes a response generator configured to provide a priority packet containing data read from the on-chip register of the serial buffer in response to the configuration read command.

9. The serial buffer of claim 4, wherein the priority packet processor is configured to implement a write access to an on-chip register of the serial buffer in response to a configuration write command embedded in a priority packet.

10. The serial buffer of claim 4, wherein the priority packet processor is configured to implement a read access to one of the one or more queues in response to a read request command embedded in a priority packet.

11. The serial buffer of claim 10, wherein the priority packet processor further includes a register configured to store queue address information embedded in the priority packets, wherein the queue address information identifies a queue to be accessed in response to a read request command.

12. The serial buffer of claim 1, wherein the priority packet processor further includes a doorbell generator configured to receive a doorbell request from flag control logic of the serial buffer, and in response, provide a priority packet containing a flag address and flag data associated with the flag address.

13. The serial buffer of claim 1, wherein the on-chip resources of the serial buffer comprises one or more configuration registers of the serial buffer.

14. The serial buffer of claim 1, wherein the data processor operates in parallel with the priority packet processor.

15. The serial buffer of claim 14, wherein the priority packet processor accesses the on-chip resources of the serial buffer without interruption from the data processor.

16. A method of operating a serial buffer comprising:
receiving both data packets and priority packets on a serial interface of the serial buffer;
routing the data packets received on the serial interface to a data processor of the serial buffer;
using the data processor to transfer the data packets to one or more queues;
routing the priority packets received on the serial interface to a priority packet processor; and
using the priority packet processor to access on-chip resources of the serial buffer in response to the priority packets.

17. The method of claim 16, further comprising identifying the start of each of the priority packets in response to a control field present in each of the priority packets.

18. The method of claim 16, further comprising determining the integrity of the priority packets received on the serial interface by detecting whether the priority packets received on the serial interface are sequentially numbered.

19. The method of claim 16, further comprising decoding commands embedded in the priority packets, thereby identifying different types of access operations specified by the priority packets.

20. The method of claim 19, further comprising storing address information embedded in the priority packets, wherein the address information identifies on-chip resources of the serial buffer to be accessed.

21. The method of claim 20, further comprising storing data embedded in the priority packets, wherein the data is written to the on-chip resources of the serial buffer identified by the address information.

22. The method of claim 19, further comprising reading configuration data from an on-chip register of the serial buffer in response to one type of access operation specified by the priority packets.

23. The method of claim 22, further comprising providing a priority packet containing configuration data read from the on-chip register of the serial buffer.

24. The method of claim 19, further comprising writing configuration data to an on-chip register of the serial buffer in response to one type of access operation specified by the priority packets.

25. The method of claim 19, further comprising using the priority packet processor to retrieve data from a queue of the one or more queues in response to one type of access operation specified by the priority packets.

26. The method of claim 25, further comprising selecting the queue in response to a queue address embedded in the priority packets.

27. The method of claim 16, further comprising:
receiving a doorbell request from flag control logic of the serial buffer; and, in response
providing a priority packet containing a flag address and flag data associated with the flag address.

28. The method of claim 16, further comprising operating the data processor in parallel with the priority packet processor, wherein the priority packet processor accesses the on-chip resources of the serial buffer without interruption from the data processor.

* * * * *